Nov. 4, 1941.  J. A. RANKIN  2,261,286
FREQUENCY MODULATION DETECTOR
Filed July 13, 1940  2 Sheets-Sheet 1
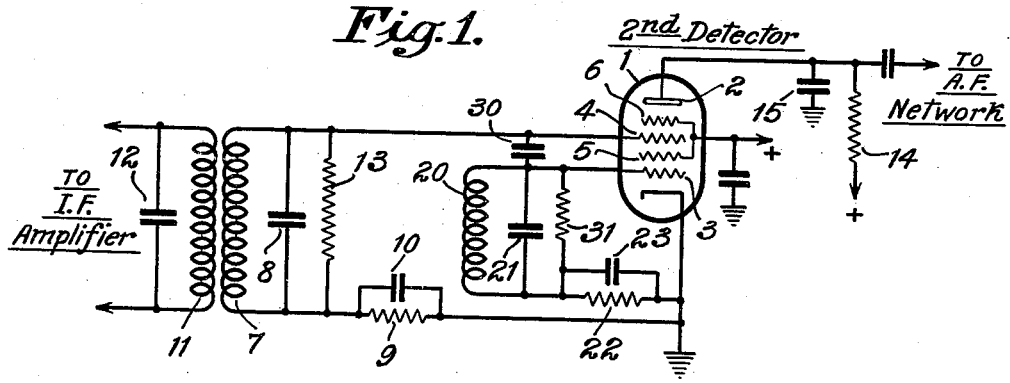
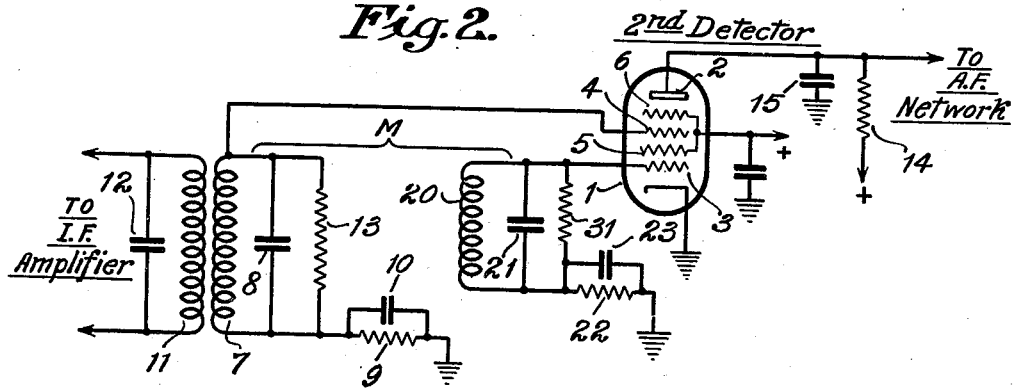
Inventor
John A. Rankin
By H. S. Grover
Attorney Nov. 4, 1941.    J. A. RANKIN    2,261,286
FREQUENCY MODULATION DETECTOR
Filed July 13, 1940    2 Sheets-Sheet 2
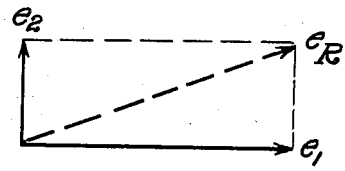
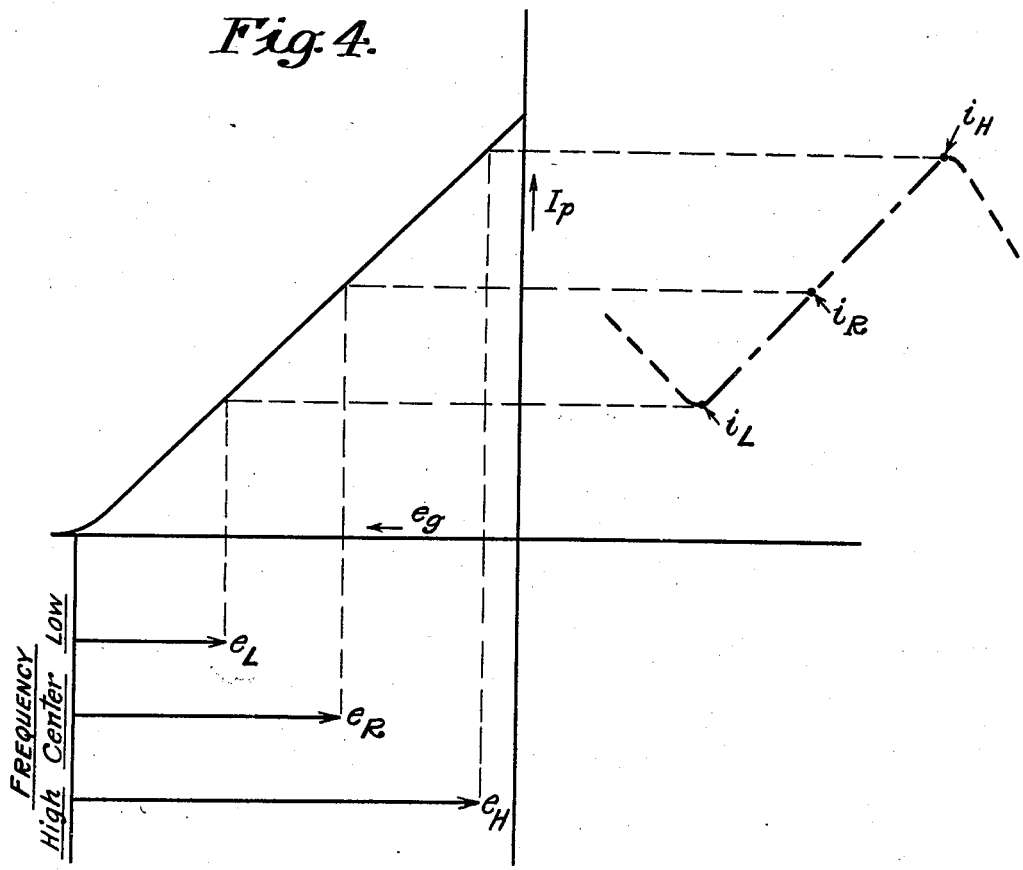
Inventor
John A. Rankin
By
H. S. Srover
Attorney Patented Nov. 4, 1941

2,261,286

UNITED STATES PATENT OFFICE 2,261,286

FREQUENCY MODULATION DETECTOR

John A. Rankin, Port Washington, N. Y., assignor to Radio Corporation of America, a corporation of Delaware Application July 13, 1940, Serial No. 345,273

10 Claims. (Cl. 250—27)

My present invention relates to frequency modulation wave detectors, and more particularly to frequency modulation detector tubes wherein there is utilized independent control electrodes of a single tube to effect detection.

One of the main objects of my present invention is to provide in a single tube a pair of control electrodes upon which there is impressed frequency modulated (FM) waves in phase quadrature relation, there being derived modulation voltage from the plate circuit of the tube.

Another important object of this invention is to provide a detector tube having at least two spaced control electrodes in a common electron stream between the cathode and the plate, FM wave energy from a common input circuit being impressed upon the spaced electrodes, the waves applied to the control electrodes being in phase quadrature relation whereby the tube plate circuit is capable of developing modulation voltage.

Still other objects of this invention are to improve generally the simplicity and efficiency of FM detector networks, and more especially to provide an FM detector network which is not only reliable in operation, but is economically manufactured and assembled.

The novel features which I believe to be characteristic of my invention are set forth in particularity in the appended claims; the invention itself, however, as to both its organization and method of operation will best be understood by reference to the following description taken in connection with the drawings in which I have indicated diagrammatically several circuit organizations whereby my invention may be carried into effect.

In the drawings:

Fig. 1 shows a circuit arrangement embodying the present invention,

Fig. 2 illustrates a modification,

Fig. 3 shows a vector diagram,

Fig. 4 graphically shows the operation of the detector.

Referring now to the accompanying drawings, wherein like reference characters in the different figures indicate similar circuit elements, there is shown in Fig. 1 a tube 1 which may be provided with a cathode, a plate 2 and four control grids arranged successively between the cathode and plate. The third grid from the cathode, which is designated by numeral 4, is connected to the high potential side of the resonant input circuit of the tube. The input circuit comprises the coil 7 and shunt condenser 8. The low potential side of the circuit is connected to the grounded end of the cathode of tube 1 through a resistor 9 which has in shunt therewith a condenser 10. The circuit 7—8 is tuned to the mean, or center, frequency of an FM wave. For example, if the receiver is of the superheterodyne type, then circuit 7—8 will be tuned to the operating intermediate frequency (I. F.) of the set. In the case of the superheterodyne receiver, tube 1 functions as the second detector and produces modulation voltage in its output circuit, while there is impressed on its input circuit the FM waves whose mean frequency is of the operating I. F. value.

Assuming that the second detector tube is utilized in a superheterodyne receiver it is not believed necessary to show the networks which precede the input circuit of the tube 1, since those skilled in the art are fully acquainted with the construction of such a receiving system. For example, assuming that the FM range is 42—50 megacycles (mc.), and that the maximum overall frequency deviation employed is about 200 kilocycles (kc.), then it will be desirable to amplify collected FM signals prior to conversion by the first detector. After amplification at I. F., the FM signals are usually transmitted through a limiter in order to eliminate any amplitude variation in the FM carrier. It may, therefore, be assumed that the input circuit 7—8 is coupled to a preceding resonant circuit which comprises the coil 11 and the shunt condenser 12. This resonant circuit is tuned to the operating I. F. value, and, of course, circuit 11—12 is reactively coupled to circuit 7—8 so as to provide a band-pass network whose effective band width may be of the order of 200 kc. so as to accommodate adequately the maximum frequency deviation of the FM signals. A resistor 13 may be arranged in shunt across circuit 7—8 in order to provide the proper band width at the second detector input. Of course, it is possible to impress upon the input grid 4 of tube 1 FM signals whose mean frequency is in the megacycle range. In other words, this invention is not limited to superheterodyne conversion of the FM signals to the I. F. range.

The grid 4 is surrounded by a pair of positive screen grids 5 and 6 which are established at a proper positive potential. The plate 2 is connected to a source of positive potential by the load resistor 14, the latter being shunted by the I. F. by-pass condenser 15. Hence, there will be developed across resistor 14 voltage components which correspond to the modulation frequency components of the FM signals. This modulation voltage, in the case of the modulation of audio frequency, may be transmitted through one or more audio frequency amplifiers which are followed by any desired type of reproducer. The grid 3 is connected to the cathode through a path which includes the coil 20 shunted by the condenser 21, and the resistor 22 is arranged in series with coil 20. The condenser 23 is connected in shunt with resistor 22. The network 20—21 is resonated to the center, or mean, frequency of the applied FM signals, which means that it is tuned to the operating I. F. value. A condenser 30 couples grid 4 to grid 3. The damping resistor 31 may be arranged in shunt across network 20—21. It will now be seen that FM signal voltage applied to grid 4 is simultaneously applied to grid 3 through the condenser 30. The FM signal voltages on grids 3 and 4 are so related that the modulation voltage is developed across resistor 14. Those skilled in the art are fully aware of the fact that the modulating audio signals exist in the carrier envelope as a frequency deviation of the carrier itself. The function of the detector is to extract from the modulated envelope the modulation voltage. In other words, the detector functions to convert the frequency deviation of the carrier into an amplitude variation in the plate circuit.

In Fig. 2, the capacity coupling 30 is replaced by a mutual magnetic coupling M which exists between the coils 7 and 20. In other words, the grid 3 is connected to the high potential side of network 20—21, while grid 4 is connected to the high potential side of circuit 7—8. The coils 7 and 20 are magnetically coupled to provide the transfer of FM signal voltage from network 7—8 to network 20—21. In other respects the circuit or Fig. 2 is similar to that shown in Fig. 1.

In the circuit of Fig. 1 the coupling between the tuned circuits 7—8 and 20—21 is by the external condenser 30. The approximate magnitude of this coupling capacity is such as to produce critical coupling between the two tuned circuits. In the arrangement of Fig. 2 the approximate magnitude of the mutual magnetic coupling M is such as to produce critical coupling between the two tuned circuits. The amount of coupling utilized is determined by the extent of the FM carrier swing, as is also the values of the damping resistors 13 and 31. Should it be desired to utilize a small frequency deviation of 30 kc. and an I. F. value of 4 mc., the resistor 13 would not likely be needed. The resistor 31 in such case would be rather high in resistive magnitude and of the order of 100,000 ohms.

On the other hand, if the frequency deviation was wider, say of the order of 150 kc., the resistor 13 might be needed, and would be given a value of the order of 100,000 ohms whereas the resistor 31 might be of the order of 10,000 to 25,000 ohms. The coupling elements 30 and M would be adjusted to approximately critical coupling for both conditions of loading. As stated previously, the source of the FM signals to be detected would usually be the output of the last I. F. amplifier. Ordinarily, the last I. F. amplifier would be a high impedance pentode tube whose output circuit would be the network 11—12.

In Fig. 3 there is illustrated a vector diagram for the condition that prevails when the modulation is removed from the carrier. In this diagram $e_1$ represents the voltage across network 7—8, while $e_2$ represents the voltage across network 20—21. These two voltages are at 90 degrees, or in quadrature, phase relationship. The coupling capacity 30 is high in impedance compared to the tuned impedance of 20—21 so that the current flow is determined only by the capacity reactance of condenser 30. Therefore, the current leads the voltage $e_1$ by 90 degrees. As the voltage $e_2$ is that across network 20—21, which at resonance is a pure resistance, this voltage is in phase with the current through it, and hence leads the voltage $e_1$ by 90 degrees. Voltages $e_1$ and $e_2$ are combined within the tube to produce plate current. The effective voltage is the vector sum of $e_1$ and $e_2$, or $e_R$, which value produces plate current as illustrated in Fig. 4 by $e_R$.

When modulation is applied to the carrier, the result is a shift in frequency both above and below the carrier frequency. Considering the first case when the carrier frequency is shifted above the carrier, this means that the fequency applied to networks 7—8 and 20—21 is above their resonant frequencies. In such case the network 20—21 exhibits a capacity reactance so that the combination of condenser 30 and network 20—21 acts as a capacity voltage divider, and the voltage $e_2$ approaches the phase of the voltage $e_1$. There is then produced a resultant voltage which may be designated by the character $e_H$ and is the voltage effective in producing plate current flow. This resultant voltage $e_H$ is illustrated in Fig. 4, and the current which is produced by it is indicated in the same figure by the reference character $i_H$.

As the carrier frequency shifts below resonance, the tuned circuit 20—21 exhibits inductive reactance. The current through condenser 30 and the inductive reactance of 20—21 is determined by reactance 30 and so leads the voltage $e_1$ by 90 degrees. The voltage drop across the reactance of 20—21 leads the current in this case. Hence, the voltage $e_2$ approaches the condition of being 180 degrees out of phase with $e_1$, the voltage that produced it. The resultant voltage in this case is denoted by the reference character $e_L$ and is the voltage effective in producing the plate current $i_L$.

In Fig. 4 there is shown a broken straight line connecting the three points $i_L$, $i_R$ and $i_H$. This line represents the variation of the plate current as the frequency of the FM waves shifts from a frequency below the resonance of networks 7—8 and 20—21 (as illustrated by $i_L$) to a frequency above the resonance of these networks (as illustrated by $i_H$). This relation occurs by virtue of the fact that the phase of $e_2$ changes continuously between the positions discussed heretofore, and the amplitude and the resultant likewise varies continuously. The extreme inclined dotted lines in Fig. 4 illustrate the plate current for extreme frequency changes. This is due to the fact that $i_L$ and $i_H$ are produced by voltages that are in nearly ±180 degrees phase relationship as compared to $e_1$ and hence can change phase no more, and due to the fact that $e_2$ is reduced in magnitude due to the inherent selectivity of 20—21.

It will now be seen that there has been provided a detector tube having a pair of spaced control electrodes in a common electron stream and upon which control electrodes there are imposed FM waves in phase quadrature, the plate current varying in amplitude in a manner which corresponds to the frequency deviation of the FM wave. It will be understood that the explanation given heretofore in connection with Fig. 1 applies equally well to Fig. 2. In general, the detector functions because the phase of the voltage on the two grids varies from a condition when they are nearly in phase to a condition when they are nearly 180 degrees out of phase. Furthermore, this type of detector circuit can be balanced by using a pair of tubes connected in push-pull relation so that zero output current occurs at the center frequency of the applied FM waves. It is also to be understood that the grids 3 and 4 can be interchanged in so far as their connection to the primary and secondary networks is concerned.

The RC networks (as 10—9) in the grid circuits function to provide amplitude limitation in the detector. They serve to line the positive input peaks along the zero bias axis. The RC networks may have time constants of the order of 2 to 25 microseconds. The screen grid, in this case of securing limiting action, would be operated at a fixed low positive potential and the reducing resistor normally used in the plate circuit would be the load. Hence, the detector concurrently acts as an amplitude limiting device.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. In a frequency modulated wave detector network, an electron discharge tube of the type comprising a cathode, a plate, and at least two spaced control electrodes disposed in the electron stream between the cathode and plate, a resonant input circuit connected between the cathode and one of said control electrodes, said resonant circuit being turned to the means frequency of applied frequency modulated waves, a second resonant circuit, tuned to said mean frequency, connected between the second of said control electrodes and said cathode, reactive means external of said tube operatively associated with both of said resonant circuits for maintaining the modulated voltages on said two control electrodes in substantially quadrature relation with respect to the center frequency of said frequency modulated waves, a separate capacity-shunted resistor network in series with each resonant network for minimizing amplitude variation in the said applied waves, and a load impedance connected to said plate for developing voltage of the modulating signal of said frequency modulated waves.

2. In a frequency modulated wave detector network, an electron discharge tube of the type comprising a cathode, a plate, and at least two spaced control electrodes disposed in the electron stream between the cathode and plate, a resonant input circuit connected between the cathode and one of said control electrodes, said resonant circuit being tuned to the mean frequency of applied frequency modulated waves, a second resonant circuit, tuned to said mean frequency, connected between the second of said control electrodes and said cathode, reactive capacitative means external of said tube operatively associated with both of said resonant circuits for maintaining the modulated voltages on said two control electrodes in substantially quadrature relation with respect to the center frequency of said frequency modulated waves, a resistor-capacitor network having a time constant of the order of 2 to 25 microseconds arranged in series with at least one of said resonant circuits for reducing amplitude variation in said applied waves, and a load impedance connected to said plate for developing voltage of the modulating signal of said frequency modulated waves.

3. In a frequency modulated wave detector network, an electron discharge tube of the type comprising a cathode, a plate, and at least two spaced control electrodes disposed in the electron stream between the cathode and plate, a resonant input circuit connected between the cathode and one of said control electrodes, said resonant circuit being tuned to the mean frequency of applied frequency modulated waves, a second resonant circuit, tuned to said mean frequency, connected between the second of said control electrodes and said cathode, reactive inductive means external of said tube operatively associated with both of said resonant circuits for maintaining the modulated voltages on said two control electrodes in substantially quadrature relation with respect to the center frequency of said frequency modulated waves, a separate capacity-shunted resistor network in series with each resonant network for minimizing amplitude variation in the said applied waves, and a load impedance connected to said plate for developing voltage of the modulating signal of said frequency modulated waves.

4. In a frequency modulated wave detector network, an electron discharge tube of the type comprising a cathode, a plate, and at least two spaced control electrodes disposed in the electron stream between the cathode and plate, a resonant input circuit connected between the cathode and one of said control electrodes, said resonant circuit being tuned to the mean frequency of applied frequency modulated waves, a second resonant circuit, tuned to said mean frequency, connected between the second of said control electrodes and said cathode, reactive means external of said tube operatively associated with both of said resonant circuits for maintaining the modulated voltages on said two control electrodes in substantially quadrature relation with respect to the center frequency of said frequency modulated waves, a resistor-capacitor network having a time constant of the order of 2 to 25 microseconds arranged in series with at least one of said resonant circuits for reducing amplitude variation in said applied waves, and a load impedance connected to said plate for developing voltage of the modulating signal of said frequency modulated waves and said reactive means comprising mutual magnetic coupling between said resonant circuits.

5. In a frequency modulated wave detector network, an electron discharge tube of the type comprising a cathode, a plate, and at least two spaced control electrodes disposed in the electron stream between the cathode and plate, a resonant input circuit connected between the cathode and one of said control electrodes, said resonant circuit being tuned to the mean frequency of applied frequency modulated waves, a second resonant circuit, tuned to said mean frequency, connected between the second of said control electrodes and said cathode, reactive means external of said tube operatively associated with both of said resonant circuits for maintaining the modulated voltages on said two control electrodes in substantially quadrature relation with respect to the center frequency of said frequency modulated waves, a separate capacity-shunted resistor network in series with each resonant network for minimizing amplitude variation in the said applied waves, and a load impedance connected to said plate for developing voltage of the modulating signal of said frequency modulated waves and a resistive element operatively associated with at least one of said resonant circuits for imparting a predetermined band width characteristic to said pair of resonant circuits.

6. In a frequency modulated wave detector network, an electron discharge tube of the type comprising a cathode, a plate, and at least two spaced control electrodes disposed in the electron stream between the cathode and plate, a resonant input circuit connected between the cathode and one of said control electrodes, said resonant circuit being tuned to the mean frequency of applied frequency modulated waves, a second resonant circuit, tuned to said mean frequency, connected between the second of said control electrodes and said cathode, reactive means external of said tube operatively associated with both of said resonant circuits for maintaining the modulated voltages on said two control electrodes in substantially quadrature relation with respect to the center frequency of said frequency modulated waves, a load impedance connected to said plate for developing voltage of the modulating signal of said frequency modulated waves, and a capacity shunted resistor in series with at least one of said resonant circuits for minimizing amplitude variation which may exist in the frequency modulated waves applied to said resonant circuit.

7. In combination with an electron discharge tube which is provided with a cathode, an output electrode and at least two control grids arranged in spaced relation in the electron stream flowing from the cathode to said output electrode, a tuned circuit connected between the cathode and one of said control grids, means for applying frequency modulated waves to said tuned circuit, a second tuned circuit connected between the second control grid and said cathode, reactive means coupling said second tuned circuit to said first tuned circuit whereby said frequency modulated waves are also applied to the second tuned circuit, said reactive coupling being so chosen that the frequency modulated waves on said control grids are in phase quadrature at the center frequency of the waves, a resistor-capacitor network having a time constant of the order of 2 to 25 microseconds arranged in series with at least one of said resonant circuits for reducing amplitude variation in said applied waves, and a load impedance connected to the output electrode for developing thereacross voltage of the modulating signal of said frequency modulated waves.

8. In combination with an electron discharge tube which is provided with a cathode, an output electrode and at least two control grids arranged in spaced relation in the electron stream flowing from the cathode to said output electrode, a tuned circuit connected between the cathode and one of said control grids, means for applying frequency modulated waves to said tuned circuit, a second tuned circuit connected between the second control grid and said cathode, reactive means coupling said second tuned circuit to said first tuned circuit whereby said frequency modulated waves are also applied to the second tuned circuit, said reactive coupling being so chosen that the frequency modulated waves on said control grids are in phase quadrature at the center frequency of the waves, a separate capacity-shunted resistor network in series with each resonant network for minimizing amplitude variation in the said applied waves, and a load impedance connected to the output electrode for developing thereacross voltage of the modulating signal of said frequency modulated waves and said reactive coupling having a magnitude such that substantial critical coupling exists between said pair of tuned circuits.

9. In combination with an electron discharge tube which is provided with a cathode, an output electrode and at least two control grids arranged in spaced relation in the electron stream flowing from the cathode to said output electrode, a tuned circuit connected between the cathode and one of said control grids, means for applying frequency modulated waves to said tuned circuit, a second tuned circuit connected between the second control grid and said cathode, reactive means coupling said second tuned circuit to said first tuned circuit whereby said frequency modulated waves are also applied to the second tuned circuit, said reactive coupling being so chosen that the frequency modulated waves on said control grids are in phase quadrature at the center frequency of the waves, a separate capacity-shunted resistor network in series with each resonant network for minimizing amplitude variation in the said applied waves, and a load impedance connected to the output electrode for developing thereacross voltage of the modulating signal of said frequency modulated waves and a damping resistor operatively associated with each of said tuned circuits for providing an overall bandpass characteristic for said coupled tuned circuits.

10. In a frequency modulated wave detector network, an electron discharge tube of the type comprising a cathode, a plate, and at least two spaced control electrodes disposed in the electron stream between the cathode and plate, a resonant input circuit connected between the cathode and one of said control electrodes, said resonant circuit being tuned to the mean frequency of applied frequency modulated waves, a second resonant circuit tuned to said mean frequency, connected between the second of said control electrodes and said cathode, reactive means operatively associated with both of said resonant circuits for maintaining said two control electrodes in substantially quadrature relation with respect to frequency modulated wave voltage, a load impedance connected to said plate, a resistor-capacitor network having a time constant of the order of 2 to 25 microseconds arranged in series with at least one of said resonant circuits for reducing amplitude variation in said applied waves, means having a high impedance for modulation voltage in shunt with said load, voltage of the modulating signal of said frequency modulated waves being developed across said load impedance.

JOHN A. RANKIN.